Nov. 12, 1957 W. W. CARDIN 2,813,171
THERMOSTATIC DEVICE
Filed May 24, 1956 2 Sheets-Sheet 1
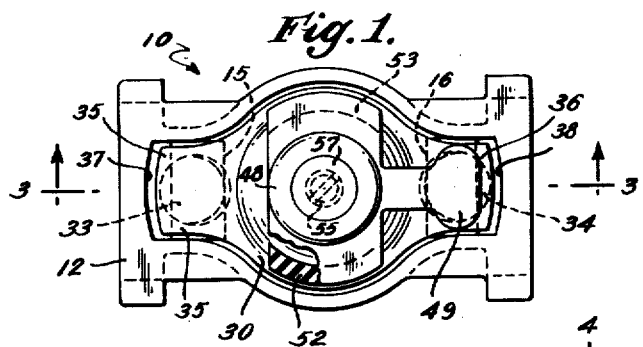
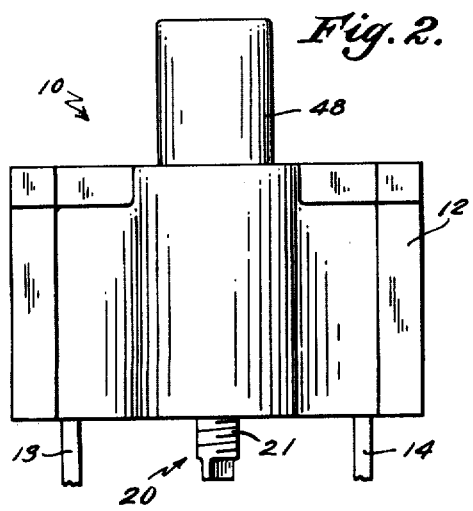
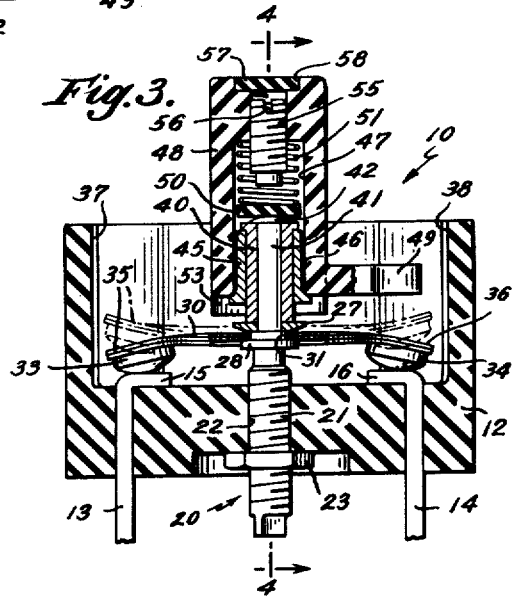
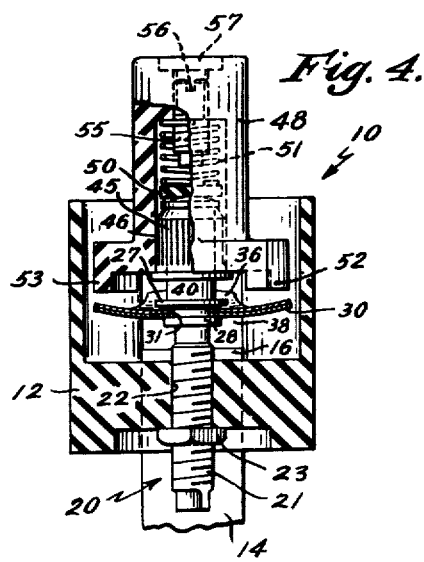
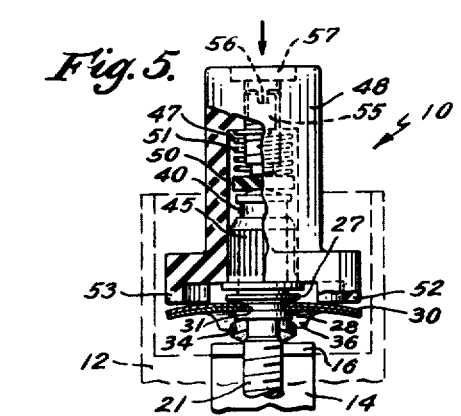
Inventor,
Wilfred W. Cardin,
by W. W. Soltow Jr.
Atty.

United States Patent Office 2,813,171
Patented Nov. 12, 1957

2,813,171

THERMOSTATIC DEVICE

Wilfred W. Cardin, Attleboro, Mass., assignor to Metals & Controls Corporation, Attleboro, Mass., a corporation of Massachusetts Application May 24, 1956, Serial No. 587,028

4 Claims. (Cl. 200—113)

This invention relates to thermostatic devices, and more particularly, to an improvement in resettable, snap-acting thermostatic devices such as circuit breakers.

By resettable, snap-acting, thermostatic devices is meant devices which are responsive to temperature change in one direction automatically to snap a movable portion from a first position to a second position, this movable portion being capable of being forcibly snapped mechanically from said second position to said first position within a particular temperature range.

Among the objects of this invention may be noted the provision of a novel thermostatic device which is capable of being easily, accurately and finely adjusted to effect the desired calibration and operating characteristics.

A further object of this invention is to provide a novel thermostatic device which is capable of being mechanically reset over a greater or smaller range, as desired, of temperatures than those within which other devices of this class are capable of being reset.

A further object of this invention is to provide an improved thermostatic device which is capable of being adjusted for its reset function in less time and with less effort and expense than that required by other corresponding devices.

A further object of this invention is to provide a resettable thermostatic device which is inexpensive to manufacture, and dependable and efficient in operation.

Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated:

Fig. 1 is a plan view of a thermostatic device embodying this invention;

Fig. 2 is a front elevational view of the device shown in Fig. 1;

Fig. 3 is a sectional view taken on the lines 3—3 of Fig. 1 and showing the thermostatic element in full-line position wherat it bridges a pair of contacts mounted by the base and in dotted-line position whereat it is disconnected from these contacts;

Fig. 4 is a sectional view taken along line 4—4 in Fig. 3, and showing the presser member in its resiliently biased, released position;

Fig. 5 is a fragmentary view similar to a portion of Fig. 4, but showing the presser member in its fully depressed position;

Figure 6:
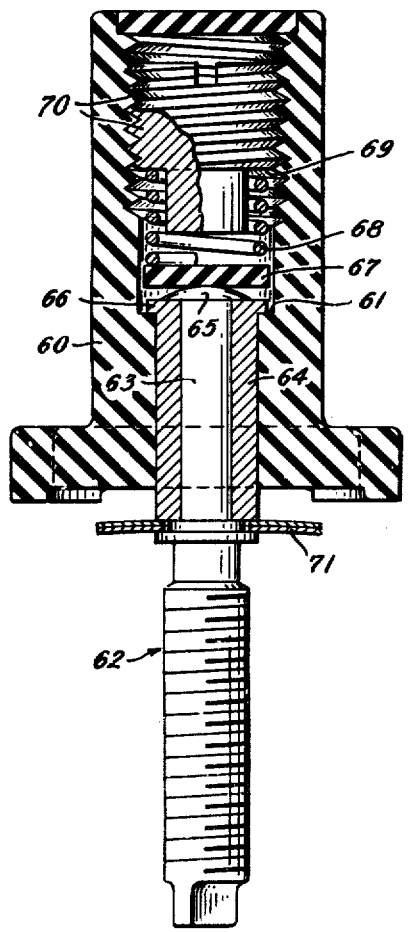
Fig. 6 is an enlarged view of a presser member and its supporting means, all of a second embodiment of this invention.

Referring more particularly to the drawing, Figs. 1-6 show an exemplary construction falling within the scope of this invention and taking the form of a thermostatic device 10. Thermostatic device 10 includes a base or base member 12 formed of a suitable insulating material such as one of the customary molded plastics. Base 12 carries a pair of terminals 13 and 14, respectively, each of which may be formed of a suitable electrically conductive material such as silver, Monel, or copper, or combinations thereof. By way of example, base member 12 may be molded about terminals 13 and 14. Each of terminals 13 and 14 includes an overturned portion 15 and 16, respectively, to form an electrical contact. Thermostatic device 10 further includes a supporting means which may take the form of a member 20. Member 20 includes a portion disposed in threaded engagement with an aperture 22 provided in the base. Member 20 may be secured in adjustably fixed relation with respect to base member 12 by means of lock nut 23.

Supporting member 20 mounts a pair of spaced flanges 27 and 28, respectively, between which a thermostatic element 30 is disposed. Thermostatic element 30 is provided with an aperture 31 within which the portion of supporting member 20 between flanges 27 and 28 is disposed. Thermostatic element 30 is loosely confined between flanges 27 and 28 so as to prevent it from substantial longitudinal movement with respect to supporting member 20. Thermostatic element 30 is confined against substantial rotation about supporting member 20 by the engagement of diametrically opposed portions 35 and 36 of the thermostatic element with the side walls of recesses 37 and 38, respectively, as provided by base member 12.

Thermostatic element 30 may be of the bimetallic type illustrated and described in U. S. Patent 2,317,831 issued April 27, 1943, to V. G. Vaughan et al. Each of portions 35 and 36 includes an electrical contact 33 and 34, respectively. Thermostatic element 30 is responsive to a change of temperature in one direction automatically to snap movable portions 35 and 36 from a first position as shown in full lines in Figs. 3 and 5 to a second position as shown in dotted lines in Fig. 3. When movable portions 35 and 36 of thermostatic element 30 are in the respective dotted-line positions shown in Fig. 3 (see also the full-line position or shape of thermostatic element 30 as shown in Fig. 4), the thermostatic element is separated from and electrically disconnects contacts 15 and 16. When the thermostatic element is in the full-line shape or position shown in Figs. 3 and 5, it bridges and electrically connects contacts 15 and 16. The characteristics of thermostatic element 30 are such that it is incapable of snapping from this second shape or position back to the first shape or position automatically in response to normal temperature changes in the opposite direction. By normal temperature changes is meant changes within a range which the device may normally be expected to encounter.

A collar 40 is disposed about a stem 41 provided by supporting member 20, and retained thereabout by means of an overturned head 42 integral with stem 41. Mounted for telescopically slidable movement with respect to collar 40 is a bushing 45 which may have its outer peripheral surface knurled as indicated at 46. Bushing 45 is press-fit into the outer portion of a socket 47 provided by a presser means, which pressure means may take the form of a push-button 48.

Push-button 48 provides a pair of projections 52 and 53 which are movable against thermostatic element 30 to snap the latter from said second position to said first position in a manner later to be described. The push-button may be formed of a suitable insulating material such as one of the customary molded plastics. Carried by push-button 48 is a guide member 49 which rides in recess 38 provided by base member 12 thereby to prevent substantial rotation of the push-button about stem 41. Within the socket 47 provided by push-button 48 is a disc 50, which is formed of electrically insulating material and one side of which is disposed in engagement with head 42 as provided by stem 41. A compression coil spring 51 has one end disposed against disc 50 and its other end disposed against the bottom of socket 47 whereby push-button 48 is resiliently biased away from thermostatic element 30.

Disposed in threaded engagement with push-button 48 is an adjusting screw 55 which may be formed of suitable metal. As best shown in Figs. 3–5, screw 55 is adjustable, by rotation relative to the push-button, toward and away from disc 50 and head 42 as provided by supporting member 20. It will be obvious from the drawing that movement of push-button 48 toward and away from thermostatic element 30 is effective to move adjusting screw 55 respectively toward and away from, disc 50 and head 42. Accordingly, adjusting screw 55, due to engagement thereof with disc 50, limits the extent of movement of push-button 48 against thermostatic element 30.

Adjusting screw 55 may be provided with a slot 56 for engagement by a screw driver to facilitate rotation of the screw. A disc 57, which may be formed of electrically insulating material, may be provided to be interfitted in a recess 58 after screw 55 has been properly adjusted.

In a manner later to be described in detail, the thermostatic device of this invention may be adjusted to render it trip-free. By trip-free is meant that the thermostatic element will be free to snap automatically upon temperature change in one direction from the full-line position to the dotted-line position shown in Fig. 3 regardless of the position or actuation of push-button 48. It follows that when the device is trip-free, full depression of the push-button will not be effective to snap the thermostatic element from the dotted-line position to the full-line position shown in Fig. 3 at least until the temperature of the thermostatic element has dropped considerably below that at which it snapped to the contact-opening position. Thermostatic device 10 is depicted in each of Figs. 3–5 as having been adjusted to provide trip-free operation. It will be apparent that, although push-button 48 is shown as being fully depressed in Fig. 5, thermostatic element 30 will be free to snap its movable portions 35 and 36 upwardly upon a temperature change in said one direction thereby electrically to disconnect electrical contacts 15 and 16 from each other.

Thermostatic device 10 may be adjusted to be resettable only below a prescribed temperature and to provide trip-free operation in the manner to be described as follows. First, thermostatic element 30, supporting member 20 and push-button 48 are assembled into operative relationship with each other, and this assembly is brought to a prescribed temperature below which the device is to be resettable. Adjusting screw 55 is screwed into push-button 48 substantially past the point at which it will be disposed when the device is finally adjusted. Push-button 48 is then depressed until stopped by the engagement of adjusting screw 55 with insulating disc 50. With the parts in this position, projections 52 and 53 provided by push-button 48 will not have moved sufficiently downwardly as viewed in Fig. 3 to snap thermostatic element 30 from the dotted-line position to the full-line position as shown in Fig. 3. While pressure is maintained on the push-button 48 to depress it fully, adjusting screw 55 is rotated to retract it in the direction away from thermostatic element 30. Retraction of adjusting screw 55 is continued only until push-button 48 has moved downwardly (as viewed in Fig. 3) against thermostatic element 30 to a sufficient extent that the thermostatic element is snapped from the dotted-line to the full-line position shown in Fig. 3. Push-button 48 is then released and the device, without more, has been adjusted for trip-free operation whereby the device is resettable at all temperatures below that to which the device was brought when so adjusted. With the device so adjusted, a suitable adhesive may be deposited against the exposed portion of the adjusting screw and the adjacent internal surfaces of push-button 48 whereby unintended rotation of the adjusting screw is prevented. Also, by positioning disc 57 in recess 58 and against this adhesive before it sets, the disc will be fixedly retained at the top of the push-button. Disc 57 may be marked with suitable indicia to indicate the calibration and rating of the thermostatic device.

It will be clear that thermostatic device 10 is capable of being adjusted to provide nontrip-free operation. In this regard, adjusting screw 55 may be fully retracted or removed from push-button 48 altogether, whereby push-button 48 will be free to be depressed to the extent that, regardless of the temperature to which thermostatic element 30 is brought, the latter will be prevented by the engagement of projections 52 and 53 therewith from snapping its movable contact-providing portions away from contacts 15 and 16.

Figure 7:
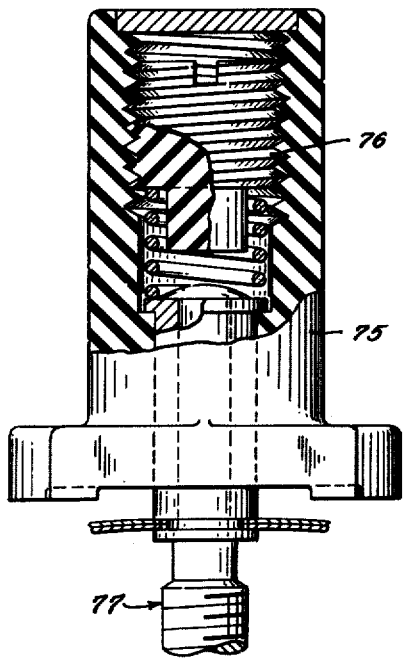
Fig. 7 is another enlarged view of a presser member and its supporting means, all of a third embodiment of this invention.

Figs. 6 and 7, respectively, show alternative embodiments of the presser means and its supporting structure. In Fig. 6, the presser means takes the form of a push-button 60 having an inwardly extending shoulder 61. Supporting member 62 provides a stem 63 about which a collar 64 is disposed. An overturned head 65 abuts an end flange 66 which is engageable with shoulder 61 of push-button 60 to limit the extent of upward movement of the latter relative to supporting member 62. An electrically insulating disc 67 abuts head 65. A compression coil spring 68 has one end bearing against disc 67 and its other end bearing against a shoulder 69 provided by an adjusting screw 70 (which may be formed of suitable metal) resiliently to bias the push-button away from the thermostatic element 71 to the position shown in Fig. 6.

In Fig. 7 the presser means takes the form of a push-button 75 which mounts an adjusting screw 76 and which is mounted on a supporting member 77. The construction shown in Fig. 7 may be identical with that shown in Fig. 6 except that adjusting screw 76 may be formed of a suitable electrically insulating material (such as one of the conventional molded plastics) whereby the insulating disc 67 of the construction shown in Fig. 6 may be eliminated without consequent possibility of an unintended electrically conductive path from supporting member 77 through adjusting screw 76.

It will be apparent that either of the constructions shown in Figs. 6 and 7, respectively, may be substituted for its counterpart in the thermostatic device shown in Figs. 1–5 to provide the same functions and to be adjusted in the same manner as that pointed out above with respect to the device of Figs. 1–5.

In view of the above, it will be seen that the several objects of the invention are achieved and other advantageous results attained.

As many changes could be made in the above constructions without departing from the scope of the invention, it is intended that all matter contained in the above description or shown in the accompanying drawings, shall be interpreted as illustrative and not in a limiting sense.

I claim:

1. In combination, a base, a first electrical contact supported by said base, a snap-acting thermostatic element, means mounting said thermostatic element adjacent said base, a second electrical contact carried by a movable portion of said thermostatic element, said thermostatic element, said thermostatic element being responsive to a temperature change in one direction automatically to snap said movable portion from a first position to a second position but being incapable of automatically snapping said movable portion from said second position to said first position in response to a normal temperature change in the opposite direction, said second contact being electrically connected to said first contact when said movable portion is in said first position and said second contact being electrically disconnected from said first contact when said movable portion is in said second position; means for resetting said thermostatic element by snapping said movable portion from said second position to said first position, said resetting means being mounted for movement relative to the mounting means for said thermostatic element and along a path toward and away from said thermostatic element, and means carried by said resetting means for adjustably limiting the extent of movement of said resetting means toward said thermostatic element, said resetting means including a portion movable against said thermostatic element when the resetting means is moved toward said thermostatic element thereby so to snap said movable portion from said second position to said first position.

2. In combination, a base, a first electrical contact supported by said base, a snap-acting thermostatic element mounted adjacent said base, a second electrical contact carried by a movable portion of said thermostatic element, said thermostatic element being responsive to a temperature change in one direction automatically to snap said movable portion from a first position to a second position but being incapable of automatically snapping said movable portion from said second position to said first position in response to a normal temperature change in the opposite direction, said second contact being electrically connected to said first contact when said movable portion is in said first position and said second contact being electrically disconnected from said first contact when said movable portion is in said second position; resetting means mounted for movement along a path toward and away from said thermostatic element, a member carried by said base, an adjusting screw mounted for adjustment toward and away from said member and for movement by said resetting means toward and away from said member, said adjusting screw, when moved by said resetting means, being engageable with said member to limit the extent of movement of the resetting means toward said thermostatic element; and said resetting means including a portion movable against said thermostatic element when the resetting means is moved toward said thermostatic element thereby to snap said movable portion from said second position to said first position.

3. In combination, a base, a first electrical contact supported by said base, a snap-acting thermostatic element, means carried by said base and mounting said thermostatic element at a first portion thereof, a second electrical contact carried by a movable portion of said thermostatic element, said thermostatic element being responsive to a temperature change in one direction automatically to snap said movable portion from a first position to a second position but being incapable of automatically snapping said movable portion from said second position to said first position in response to a normal temperature change in the opposite direction, said second contact being electrically connected to said first contact when said movable portion is in said first position and said second contact being electrically disconnected from said first contact when said movable portion is in said second position; resetting means mounted for movement relative to said first-named means along a path toward and away from said thermostatic element, an adjustable member, said resetting means mounting said adjustable member for adjustment toward and away from said first-named means correspondingly to adjust the extent of movement of the resetting means toward said thermostatic element, said resetting means including a portion movable against said thermostatic element when the resetting means is moved toward said thermostatic element thereby to snap said movable portion from said second position to said first position.

4. In combination, a base, a first electrical contact supported by said base, a snap-acting thermostatic element, a supporting member carried by said base and mounting said thermostatic element at a first portion thereof, a second electrical contact carried by a movable portion of said thermostatic element, said thermostatic element being responsive to a temperature change in one direction automatically to snap said movable portion from a first position to a second position but being incapable of automatically snapping said movable portion from said second position to said first position in response to a normal temperature change in the opposite direction, said second contact being electrically connected to said first contact when said movable portion is in said first position and said second contact being electrically disconnected from said first contact when said movable portion is in said second position; a resetting member mounted for movement on said supporting member toward and away from said thermostatic element, an adjusting screw mounted on said resetting member for adjustment toward and away from said supporting member and said thermostatic element correspondingly to adjust the extent of movement of the resetting means toward said thermostatic element, said resetting means including a projection adapted to be moved against said thermostatic element when the resetting means is moved toward said thermostatic element thereby to snap said movable portion from said second position to said first position.

References Cited in the file of this patent

UNITED STATES PATENTS

| | | |
|---|---|---|
| 1,865,219 | Spencer | June 28, 1932 |
| 2,032,136 | Lee | Feb. 25, 1936 |
| 2,300,530 | Swingle | Nov. 3, 1942 |
| 2,434,984 | Bolesky et al. | Jan. 27, 1948 |
| 2,696,538 | O'Neill | Dec. 7, 1954 |

U. S. DEPARTMENT OF COMMERCE

PATENT OFFICE

CERTIFICATE OF CORRECTION

Patent No. 2,813,171                                                                  November 12, 1957

Wilfred W. Cardin

It is hereby certified that error appears in the printed specification of the above numbered patent requiring correction and that the said Letters Patent should read as corrected below.

Column 2, line 57, after "meant" insert -- temperature --; line 66, for "pressure" read -- presser --; column 4, line 73, strike out "said thermostatic element,"; column 6, line 16, for "corresponding" read -- correspondingly --.

Signed and sealed this 11th day of March 1958.

(SEAL)
Attest:

KARL H. AXLINE
Attesting Officer

ROBERT C. WATSON
Commissioner of Patents